US008631586B2

(12) United States Patent
Leroy

(10) Patent No.: US 8,631,586 B2
(45) Date of Patent: Jan. 21, 2014

(54) ENERGY EFFICIENT CLOTHES DRYER AND CHILD SAFETY BARRIER THEREFOR

(76) Inventor: Pierre Carol Leroy, Mattapan, MA (US)

(*) Notice: Subject to any disclaimer, the term of this patent is extended or adjusted under 35 U.S.C. 154(b) by 1171 days.

(21) Appl. No.: 11/731,412

(22) Filed: Mar. 30, 2007

(65) Prior Publication Data

US 2007/0227035 A1 Oct. 4, 2007

Related U.S. Application Data

(60) Provisional application No. 60/788,162, filed on Mar. 31, 2006.

(51) Int. Cl.
F26B 11/02 (2006.01)

(52) U.S. Cl.
USPC .............. 34/595; 34/607; 68/19; 8/159

(58) Field of Classification Search
USPC ............ 34/595, 601, 603, 607, 609, 610; 68/5 C, 5 R, 19, 20; 8/137, 149, 159
See application file for complete search history.

(56) References Cited

U.S. PATENT DOCUMENTS

| | | | | |
|---|---|---|---|---|
| 1,607,841 A | * | 11/1926 | Nelson | 34/87 |
| 1,974,019 A | * | 9/1934 | Edwards | 99/339 |
| 2,034,800 A | | 3/1936 | Dougherty | |
| 2,048,743 A | * | 7/1936 | Huebsch et al. | 34/599 |
| 2,108,084 A | * | 2/1938 | Strobridge | 34/610 |
| 2,442,451 A | * | 6/1948 | Albin | 219/774 |
| 2,521,712 A | * | 9/1950 | Geldhof | 34/82 |
| 2,648,142 A | * | 8/1953 | Shapter | 34/82 |
| 2,655,804 A | * | 10/1953 | Clark | 68/23.3 |
| 2,707,837 A | * | 5/1955 | Paulsen et al. | 34/607 |
| 2,728,481 A | * | 12/1955 | Robinson et al. | 220/4.02 |
| 2,739,219 A | | 3/1956 | Tagliaferri | |
| 2,798,306 A | * | 7/1957 | Reiter | 34/609 |
| 2,814,886 A | * | 12/1957 | Fowler | 34/605 |
| 2,827,276 A | * | 3/1958 | Racheter | 432/62 |
| 2,853,798 A | * | 9/1958 | Morrison | 34/75 |
| 2,983,050 A | * | 5/1961 | Alaback | 34/90 |
| 3,000,108 A | * | 9/1961 | Jones et al. | 34/607 |
| 3,034,226 A | * | 5/1962 | Conlee | 34/596 |
| 3,042,471 A | * | 7/1962 | Haslup | 312/329 |
| 3,197,886 A | * | 8/1965 | Brame et al. | 34/90 |
| 3,199,568 A | * | 8/1965 | Baumanns et al. | 431/215 |
| 3,222,887 A | * | 12/1965 | Barletta | 464/136 |
| 3,280,699 A | * | 10/1966 | Badalich | 353/57 |
| 3,513,566 A | * | 5/1970 | Baird et al. | 34/601 |
| 3,558,110 A | * | 1/1971 | Kushner | 432/46 |
| 3,643,349 A | * | 2/1972 | Zenz | 34/595 |
| 3,724,526 A | * | 4/1973 | Huprich | 160/368.1 |
| 3,749,030 A | * | 7/1973 | Burden et al. | 110/233 |
| 3,752,090 A | * | 8/1973 | Frankel et al. | 4/111.3 |

(Continued)

*Primary Examiner* — Steve M Gravini
(74) *Attorney, Agent, or Firm* — James Ray Assoc

(57) ABSTRACT

A clothes dryer includes a hollow housing having a hinged door. A perforated drum is mounted for rotation within the housing and in alignment with the door aperture and is rotatable by an electric motor. An electrically operable oil-filled radiator is positioned within a bottom portion of the hollow housing and below the rotating drum and is connectable to a source of conventional household electrical power for generating radiant heat upon supply of the electrical power. The heat rises through the perforated rotating drum for drying wet clothes contained therein. The invention also provides a novel child safety device which is positioned within the door aperture for preventing passage of the child therethrough.

20 Claims, 2 Drawing Sheets

(56) References Cited

U.S. PATENT DOCUMENTS

| | | | | |
|---|---|---|---|---|
| 3,845,289 A * | 10/1974 | French | | 701/117 |
| 3,853,622 A * | 12/1974 | Rutten | | 134/25.4 |
| 3,879,868 A * | 4/1975 | Gerstenberger et al. | | 38/11 |
| 3,942,851 A * | 3/1976 | Kaplan | | 312/120 |
| 3,978,592 A * | 9/1976 | Schuurink | | 34/82 |
| 4,091,548 A * | 5/1978 | Daily | | 34/600 |
| 4,112,590 A * | 9/1978 | Muller | | 34/75 |
| 4,148,265 A * | 4/1979 | Acosta | | 109/59 R |
| 4,669,199 A * | 6/1987 | Clawson et al. | | 34/82 |
| 4,934,559 A * | 6/1990 | Putnam | | 220/377 |
| 5,052,809 A * | 10/1991 | Young | | 366/25 |
| 5,256,354 A * | 10/1993 | Chadwick | | 264/119 |
| 5,371,956 A * | 12/1994 | St. Louis | | 34/599 |
| 5,388,782 A * | 2/1995 | King | | 242/557 |
| 5,402,809 A * | 4/1995 | Smith | | 134/129 |
| 5,416,983 A * | 5/1995 | Moser | | 34/250 |
| 5,417,233 A * | 5/1995 | Thomas et al. | | 134/93 |
| 5,421,103 A * | 6/1995 | Wunderlich | | 34/599 |
| 5,443,637 A * | 8/1995 | Long et al. | | 118/16 |
| 5,463,821 A * | 11/1995 | Gauer | | 34/261 |
| 5,651,188 A * | 7/1997 | Swanson et al. | | 34/82 |
| 5,664,339 A * | 9/1997 | Swanson et al. | | 34/82 |
| 5,713,139 A * | 2/1998 | Briggs | | 34/602 |
| 5,806,204 A * | 9/1998 | Hoffman et al. | | 34/92 |
| 5,819,437 A * | 10/1998 | Briggs | | 34/604 |
| 5,940,988 A * | 8/1999 | Eisen | | 34/596 |
| 6,031,012 A * | 2/2000 | Nakanishi et al. | | 521/111 |
| 6,036,988 A * | 3/2000 | Lemme et al. | | 426/466 |
| 6,151,795 A * | 11/2000 | Hoffman et al. | | 34/92 |
| 6,206,073 B1 * | 3/2001 | Lay | | 160/1 |
| 6,329,933 B1 * | 12/2001 | Mikesic | | 340/946 |
| 6,370,798 B1 * | 4/2002 | Gonzalez, Sr. | | 34/595 |
| 6,502,859 B1 * | 1/2003 | Svetlik | | 280/749 |
| 6,527,430 B2 * | 3/2003 | Osborn | | 366/97 |
| 6,761,049 B2 * | 7/2004 | Nitschmann et al. | | 68/5 E |
| 6,766,596 B1 * | 7/2004 | Bienick et al. | | 34/601 |
| 6,818,177 B1 * | 11/2004 | Turcotte | | 422/24 |
| 6,862,903 B2 * | 3/2005 | Nitschmann et al. | | 68/5 E |
| 6,922,913 B2 * | 8/2005 | Hood et al. | | 34/595 |
| 6,941,680 B1 | 9/2005 | Zielewicz et al. | | |
| 6,954,992 B2 * | 10/2005 | Hwang | | 34/108 |
| 6,998,549 B1 * | 2/2006 | Bender et al. | | 200/50.12 |
| 7,064,296 B1 * | 6/2006 | Harned et al. | | 219/391 |
| 7,140,123 B2 * | 11/2006 | Lee | | 34/601 |
| 7,320,186 B2 * | 1/2008 | Schone | | 34/603 |
| 7,322,127 B2 * | 1/2008 | Hwang | | 34/603 |
| 7,345,133 B2 * | 3/2008 | Heuer et al. | | 528/196 |
| 7,360,323 B2 * | 4/2008 | Lee et al. | | 34/601 |
| 7,364,315 B2 * | 4/2008 | Chien | | 362/84 |
| 7,380,423 B1 * | 6/2008 | Musone | | 68/20 |
| 7,531,065 B2 * | 5/2009 | Yamamoto | | 202/160 |
| 7,531,761 B2 * | 5/2009 | Carson et al. | | 200/50.12 |
| 2002/0190513 A1 * | 12/2002 | Svetlik | | 280/749 |
| 2003/0006575 A1 * | 1/2003 | Genis et al. | | 280/163 |
| 2003/0231485 A1 * | 12/2003 | Chien | | 362/84 |
| 2004/0064970 A1 * | 4/2004 | Hagemann et al. | | 34/597 |
| 2004/0107598 A1 * | 6/2004 | Hwang | | 34/601 |
| 2004/0111916 A1 * | 6/2004 | Hwang | | 34/601 |
| 2005/0011742 A1 * | 1/2005 | Yamamoto | | 203/1 |
| 2005/0050762 A1 * | 3/2005 | Hood et al. | | 34/595 |
| 2005/0097772 A1 * | 5/2005 | Lee | | 34/601 |
| 2005/0151620 A1 * | 7/2005 | Neumann | | 340/5.52 |
| 2006/0094855 A1 * | 5/2006 | Heuer et al. | | 528/196 |
| 2006/0107548 A1 * | 5/2006 | Ford | | 34/601 |
| 2006/0148984 A1 * | 7/2006 | Persigehl et al. | | 525/67 |
| 2006/0265899 A1 * | 11/2006 | Renzo | | 34/603 |
| 2007/0051012 A1 * | 3/2007 | Schoene | | 34/603 |
| 2007/0227035 A1 * | 10/2007 | Leroy | | 34/602 |
| 2008/0190747 A1 * | 8/2008 | Carson et al. | | 200/50.1 |
| 2009/0064534 A1 * | 3/2009 | LeClerc | | 34/603 |
| 2009/0073694 A1 * | 3/2009 | Scannell, Jr. | | 362/253 |
| 2009/0083991 A1 * | 4/2009 | Prajescu | | 34/601 |
| 2009/0083992 A1 * | 4/2009 | Prajescu et al. | | 34/601 |
| 2009/0189463 A1 * | 7/2009 | Puri et al. | | 307/328 |
| 2009/0307923 A1 * | 12/2009 | Hu | | 34/218 |

\* cited by examiner

ENERGY EFFICIENT CLOTHES DRYER AND CHILD SAFETY BARRIER THEREFOR

CROSS-REFERENCE TO RELATED APPLICATIONS

This application is related to and claims priority from U.S. Provisional Patent Application Ser. No. 60/788,162 filed on Mar. 31, 2006.

FIELD OF THE INVENTION

The present invention relates, in general, to a clothes dryer and, more particularly, this invention relates to energy efficient clothes dryer employing an electrically operable oil-filled radiator for providing required heat and, yet more particularly, the instant invention relates to a novel child safety barrier for use with a clothes dryer of the present invention as well as with any other appliance having an opening large enough for the child to pass through.

BACKGROUND OF THE INVENTION

As is generally well known, a conventional electric clothes dryer operates on 220 volts of power and therefore requires a dedicated voltage outlet. Furthermore, the need to use higher voltage increases the installation and operating costs of the clothes dryer. Due to rising energy costs, some consumers cannot afford to use a powerful clothes dryer as often as they would like while others do not have 220 volts power supply available to them.

Prior to the present invention, efforts have been made to provide a cost efficient clothes dryer. U.S. Pat. No. 6,941,680 issued to Zielewicz et al. discloses a clothes dryer that is connected to, and operates as part of, a home heating system. The clothes dryer is operatively attached to the home heating boiler in the same way as a zone thermostat, and makes a demand from the heating system in a similar fashion. When the demand is made, the clothes dryer receives heated fluid when the dryer is turned on. The dryer comprises a heat-exchanging radiator, which receives the heated fluid from the fluid flow system. The fluid-filled radiator radiates heat into a clothes-drying chamber, which forms part of a motor-driven, rotating drum. The rotating drum tumbles the clothes as heat is projected into the drying chamber, thus driving the moisture from the clothes. However, the prior art clothes dryer of U.S. Pat. No. 6,941,680 requires higher than desirable installation effort and cannot be easily moved to a different location when need arises.

Another long felt need is to provide for safe environment of using appliance, such as a clothes dryer, in a household having a small child. It is well known that small child can easily open the door and crawl inside the appliance with the door often closing behind him or her thus often causing injuries to the child and sometimes death.

SUMMARY OF THE INVENTION

According to one embodiment, the invention provides an energy efficient clothes dryer. The clothes dryer includes a hollow housing which has a door aperture formed in a predetermined portion thereof. A door is provided and has each of a predetermined size and a predetermined shape. A hinge means hingeably connect the door to the hollow housing for selectively opening and closing the door aperture. There is a perforated drum which is rotatably mounted within the hollow housing and in alignment with the door aperture and which is capable of receiving wet clothes. An electrically operable oil-filled radiator is positioned within a bottom portion of the hollow housing and below the rotating drum. The radiator is connectable to a source of electrical power for generating radiant heat upon supply of the electrical power. The heat rises through the perforated rotating drum for drying wet clothes contained therein.

According to another embodiment of the invention, therein is provide a child safety system for an appliance having a door aperture formed in one wall thereof which is sized sufficiently to enable passage of a child therethrough and into a cavity of the appliance. The child safety system includes a child safety device which is sized to cover a predetermined portion of the door aperture sufficient to prevent passage of the child therethrough. A securing means is provided for releaseably securing the safety device in a position for selectively covering and uncovering the predetermined portion of the door aperture.

According to a further embodiment, the present invention provides a child safety device for preventing a child to pass through a door aperture formed in one wall of an appliance and into a cavity of the appliance. The child safety device includes a peripheral frame. A plurality of elongated members are secured to the peripheral frame and are overlaid in a crisscross pattern to each other. Means is disposed on and secured to the frame for releaseably securing the device in a position to cover at least a portion of the door aperture which is sufficient to prevent passage of the child therethrough.

OBJECTS OF THE INVENTION

It is, therefore, one of the primary objects of the present invention to provide a clothes dryer which is capable of consuming less energy than presently available conventional electrical clothes dryers.

Another object of the present invention is to provide a clothes dryer which employs electric oil-filled radiator for generating heat required to dry wet clothes.

Yet another object of the present invention is to provide a clothes dryer which is energy efficient.

Still another object of the present invention is to provide a clothes dryer which employs electric oil-filled radiator operable from a conventional household 110/120 volts power supply.

A further object of the present invention is to provide a clothes dryer which is mobile.

Yet a further object of the present invention is to provide a clothes dryer which reduces installation and operating costs.

An additional object of the present invention is to provide a child safety device for covering at least a portion of a door aperture formed in an appliance, such as clothes dryer and the like.

Another object of the present invention is to provide a child safety device for covering at least a portion of a door aperture formed in an appliance, which can be easily and simply installed and removed by an adult.

Yet another object of the present invention is to provide a child safety device for covering at least a portion of a door aperture formed in an appliance, which cannot be removed by a child.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
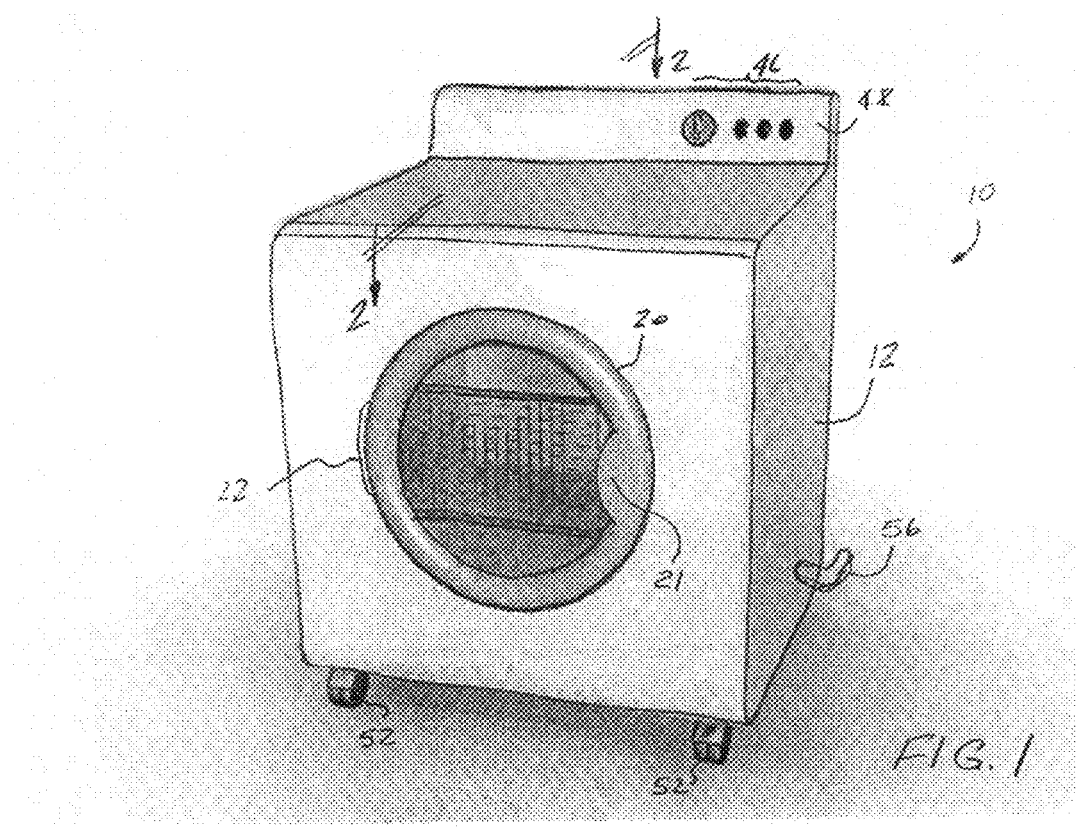
FIG. 1 is a perspective view of a clothes dryer of the present invention.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of an appliance applies to any household and commercial appliance and includes but is not limited to clothes dryer, clothes washer, dishwasher, stove, oven, microwave oven, refrigerator, freezer and the like.

Figure 2:
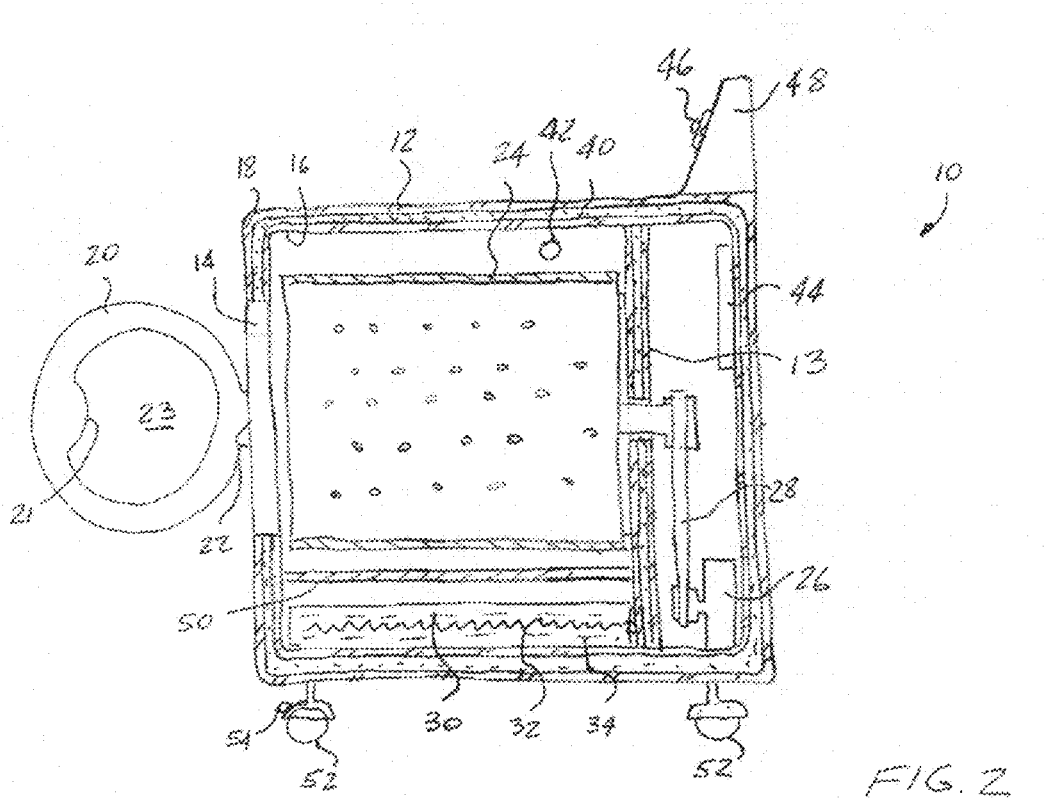
FIG. 2 is a schematically shown cross-sectional view of the clothes dryer along lines 2-2 of FIG. 1.

Now in reference to FIGS. 1-2 and in accordance with one embodiment of the invention, therein is shown and provided a clothes dryer, generally designated as 10, for removing moisture from wet clothes. The clothes dryer 10 includes, in a conventional manner, a hollow housing 12 having a door aperture 14 formed in a portion thereof. Although, such door aperture 14 is shown in FIG. 1 as being formed in the front wall portion of the clothes dryer 10, it can be also disposed within the top wall surface as is well known in the art. Preferably, for the reasons described below, the hollow housing 12 has a double wall construction. Specifically, each wall member includes an interior wall portion 16 and an exterior wall portion 18 which is spaced from the interior wall portion at a predetermined distance.

There is a door member 20 and a hinge means 22 which is provided for hingeably connecting the door member 20 to the hollow housing 12 for selectively opening and closing the door aperture 14. In a conventional manner, the door 20 includes a handle 21 and a glass portion 23. By way of an example only, the door 20 is shown in FIGS. 1-2 as having a circular shape with a semi-circular shaped handle 21 protruding into the glass portion 23.

Also in a conventional manner, the clothes dryer 10 includes a perforated drum 24 which is mounted for rotation within the hollow housing 12 and in alignment with the door aperture 14. The drum 24 is capable of receiving wet clothes. Power drive means, such as a motor 26 and belt 28 are provided for rotating the drum 24 and may be disposed behind a partition 13, although the present invention contemplates that any other well known drive systems capable of rotating the drum 24 can be employed in the clothes dryer 10.

Additionally, the clothes dryer 10 includes an electrically operable oil-filled radiator 30 which is positioned within a bottom portion of the hollow housing 12 and below the rotating drum 24. The radiator 30 is connectable to a source of electrical power for generating radiant heat upon supply of the electrical power. The radiant heat rises through the perforated rotating drum 24 for drying wet closes contained therein. Essentially, the radiator 30 includes a body of oil 34 which is heated by way of an electrical coil 32 inserted thereinto. The radiator 30 may be of a design type disclosed in U.S. Pat. No. 2,739,219 issued to Tagliaferri or U.S. Pat. No. 2,034,800 issued to Dougherty, both of which are incorporated into this document by reference thereto. The present invention also contemplates that any other known design of oil-filled radiator using an electrical energy to heat the oil may be employed in the clothes dryer 10 of the present invention. Advantageously, the clothes dryer 10 of the present invention is connectable to a conventional household 110/120 volt power supply outlet and therefore avoids the expense of specially installed and electrically wired 220 volts power supply outlet. Thus, the clothes dryer 10 of the present invention is suitable for use in mobile homes, motor homes and other applications wherein such 220 volts power supply is impractical. Another advantage of the clothes dryer 10 of the present invention is that it consumes less energy than traditional clothes dryers utilizing electrical heating elements providing for energy efficient method of drying wet clothes.

Since the clothes dryer 10 uses radiant heat to dry wet clothes, an insulation means 40 is disposed within each wall intermediate the interior and the exterior wall portions, 16 and 18 respectively, for minimizing heat loss.

A temperature sensing means, preferably such as a thermostat 42, is operably mounted within the hollow housing 12 for sensing temperature of the generated heat and for providing a temperature signal characterizing the sensed temperature. The temperature signal is received by the control system 44 which is responsive to such temperature signal for selectively activating and deactivating supply of electrical power to the heating element 32 and, more particularly, for heating the body of oil 34 to generate required heat based on the temperature setting manually set by the user of the clothes dryer 10. It will be appreciated that conventional control selection means 46 is incorporated into the clothes dryer 10 and is conventionally mounted within a control panel 48 which is positioned at the rear of the clothes dryer 10 and above the hollow housing 12.

Also, in a conventional manner, a lint cover 50 is operatively and removably positioned intermediate the rotating drum 24 and the radiator 30.

The clothes dryer 10 may be positioned in an upright position on plurality of conventional feet levelers (not shown). Preferably, the clothes dryer 10 includes a plurality of wheels 52 which are secured to a bottom portion of the hollow housing 10 at each corner thereof for facilitating movement of and providing mobility for the clothes dryer 10. Preferably, at least one of the four wheels 52 includes a conventional locking means 54 for preventing its rotation.

An optional vent means 56 may be provided within the clothes dryer 10 depending on installation requirements.

Figure 3:
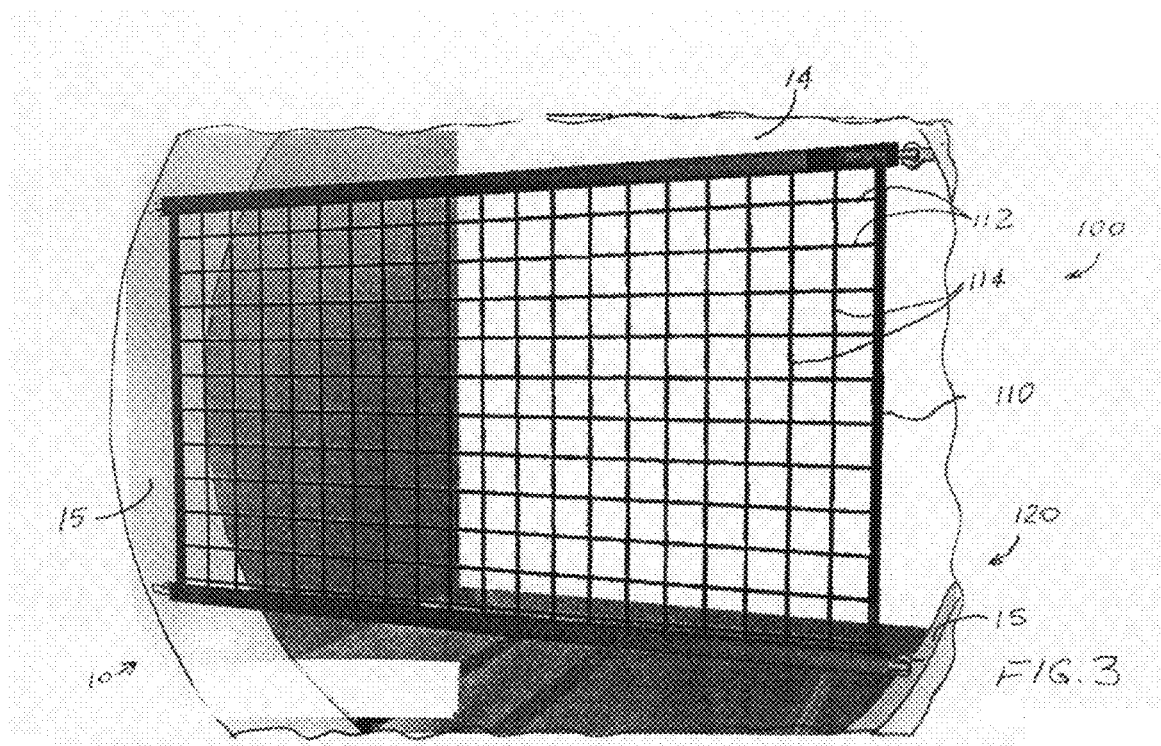
FIG. 3 is a perspective view of a child safety device of the present invention for covering a portion of a door aperture of the clothes dryer of FIG. 1.
Figure 4:
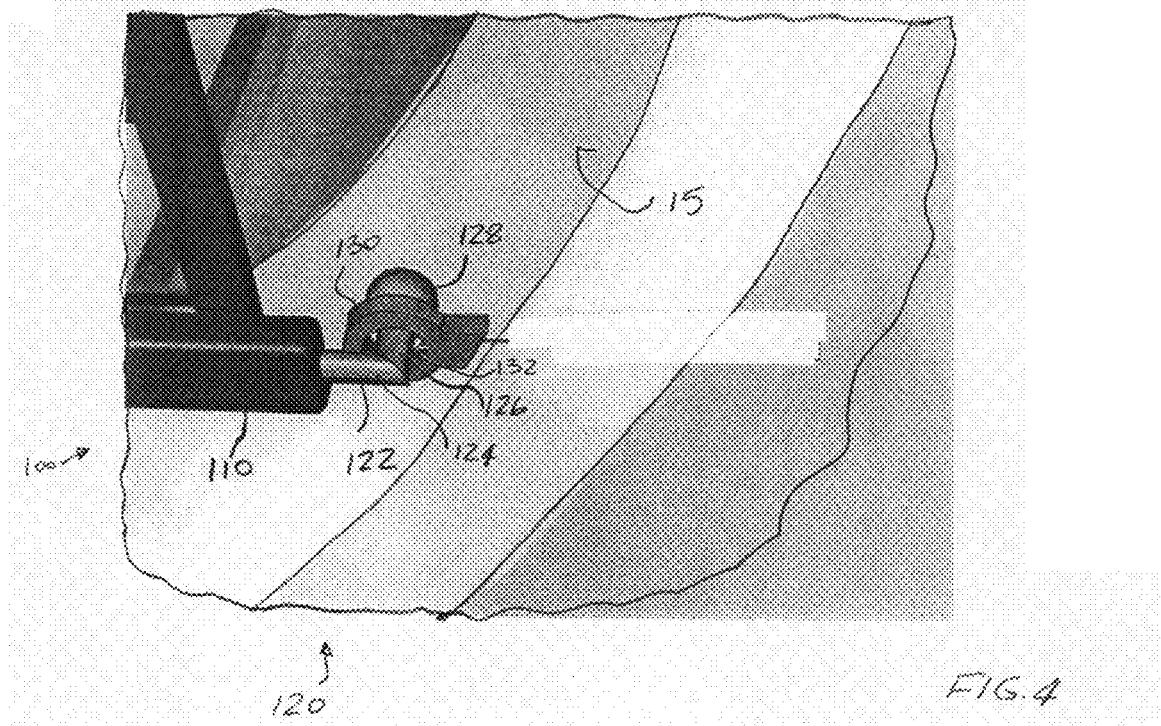
FIG. 4 is partial perspective view of the securing means constructed according to a presently preferred embodiment, for releaseably securing the child safety device of FIG. 3 within the door aperture of the clothes dryer of FIG. 1.

Now in reference to FIGS. 3-4 and in accordance with another embodiment, the invention provides a novel child safety device, generally designated as 100, for preventing a child to pass through the door aperture 14 formed in one wall of the clothes dryer 10 and into its internal cavity and, more particularly, into the drum 24. In the presently preferred embodiment of the invention, the child safety device 100 includes a peripheral frame 110, a plurality of elongated members 112 and 114 which are secured to the peripheral frame 110 and which are overlaid in a crisscross pattern to each other and means, generally designated as 120, which is disposed on and secured to the frame 110 for releaseably securing the device 100 in a position to cover at least a portion of the door aperture 14. It will be appreciated that such portion is being sufficient to prevent passage of the child therethrough.

Preferably, the child safety device 100 is positioned within the door aperture 14.

By way of an example only, the securing means 120 includes at least a pair of members 122 each having a first portion 124 which extends outwardly from the peripheral frame 110 in a direction coplanar with the peripheral frame 110, a second portion 126 which is secured to a free end of the first portion 124 and which is disposed generally perpendicular thereto and a spherical portion 128 which is secured to a free end of the second portion 126. The spherical portion 128 is made from an elastic material capable of deforming slightly under pressure and returning to original shape when the pressure is removed. Accordingly, at least a pair of receptacles means 130 is formed in a spaced relationship within the interior surface of the door aperture 14 and which is positioned complimentary to the securing means 120. Each receptacle means 130 has an aperture 132 which is sized smaller than the diameter of the spherical portion 128.

In operation, to cover portion of the door aperture 14, the spherical portion 128 is first inserted through the aperture 132 in a slightly deformed manner and then is positioned behind the receptacle means 130 wherein it returns to its original size and shape thus being interlocked with the receptacle means 130. The material and size of the spherical portion 128 and the material of the receptacles means 130 and the size of its aperture 132 are selected to prevent a child from exerting a sufficient force to remove the spherical portion 128 through the aperture 132 and thus remove the child safety device form the door opening 14 while allowing an adult to easily remove and install such child safety device 100.

Any material or combinations of materials are suitable in manufacturing the child safety device 100 of the present invention. For example, the device 100 may be formed as a simple wire mesh from a metallic material and may also include a coating of an elastic material such as rubber. Alternatively, the device 100 may be formed as a simple wire mesh from a plastic material of either rigid or a semi-rigid type. Rubber material is also advantageous for employment in the spherical portion 128 to provide for temporary deformation during insertion through the aperture 132.

Although the child safety device of the present invention has been shown in terms of the simple wire mesh, it will be apparent to those skilled in the art, that the child safety device of the present invention may be provided with a solid surface.

Furthermore, the receptacle means 132, which are shown in FIGS. 3-4 as protruding into the door aperture 14, may be disposed below the interior surface 15 of the door aperture 14.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A clothes dryer comprising:
   (a) a hollow housing having a door aperture formed in a predetermined portion thereof;
   (b) a door having each of a predetermined size and a predetermined shape;
   (c) a hinge means for hingeably connecting said door to said hollow housing for selectively opening and closing said door aperture;
   (d) a perforated drum mounted for rotation within said hollow housing and in alignment with said door aperture, said drum capable of receiving wet clothes;
   (e) a means for rotating said drum; and
   (f) an electrically operable oil-filled radiator which is positioned within a bottom portion of said hollow housing and below said rotating drum, said radiator is connectable to a source of electrical power for generating radiant heat upon supply of said electrical power, wherein said heat rises through said perforated rotating drum for drying wet clothes contained therein.

2. The clothes dryer, according to claim 1, wherein each wall member of said hollow housing includes an interior wall portion and an exterior wall portion spaced therefrom at a predetermined distance.

3. The clothes dryer, according to claim 2, wherein said clothes dryer includes an insulation means disposed within said each wall member intermediate said interior and said exterior wall portion.

4. The clothes dryer, according to claim 1, wherein said clothes dryer further includes a temperature sensing means which is operably mounted within said housing for sensing a temperature of said generated heat and for providing a temperature signal characterizing said sensed temperature.

5. The clothes dryer, according to claim 4, wherein said clothes dryer further includes a control means for at least operating said radiator and wherein said temperature sensing means is connected to said control means, whereby said control means receives said temperature signal and is responsive thereto for selectively activating and deactivating an electrical heating element disposed within said radiator.

6. The clothes dryer, according to claim 4, wherein said temperature sensor is a thermostat.

7. The clothes dryer, according to claim 1, wherein said clothes dryer further includes a lint cover which is operatively and removably positioned intermediate said radiator and said rotating drum.

8. The clothes dryer, according to claim 1, wherein said clothes dryer further includes a child safety device and means for removably securing said child safety device within a peripheral surface of the door aperture in order to form a barrier and to prevent child passage through said door aperture and into said rotating drum when said door is open.

9. The clothes dryer, according to claim 8, wherein said child safety device includes each of a frame and a mesh mounted within said frame.

10. The clothes dryer, according to claim 9, wherein said securing means includes at least a pair of receptacles secured in a spaced relationship to the peripheral surface of said door aperture and extending thereinto and at least a pair of members extending outwardly from a peripheral surface of said frame, each engaging a respective receptacle in a snap-fit manner.

11. The clothes dryer, according to claim 1, wherein said clothes dryer further includes a vent means operably disposed within said hollow housing.

12. The clothes dryer, according to claim 1, wherein said clothes dryer further includes four wheels which are mounted to a bottom portion of said hollow housing for facilitating movement of said clothes dryer.

13. The clothes dryer, according to claim 12, wherein at least one of said four wheels includes a locking means for preventing its rotation.

14. A child safety system for an appliance having a door aperture formed in one wall thereof which is sized sufficiently to enable passage of a child therethrough and into a cavity of the appliance, the door aperture being defined by a peripheral surface disposed within the one wall of the appliance, the appliance further having a door movable between an open position for uncovering the door aperture and a closed position for covering the door aperture, the door is disposed generally planar with the one wall of the appliance in the close position, said child safety system comprising:

(a) a child safety device positioned within the door aperture and within the peripheral surface thereof, said child safety device sized to cover a predetermined portion of the door aperture sufficient to prevent passage of the child therethrough when the door is disposed in the open position; and (b) a securing means for releaseably securing said safety device in a position for selectively covering and uncovering the predetermined portion of the door aperture, said securing means including at least a pair of receptacles protruding into the door aperture from the peripheral surface thereof and at least a pair of members, each of said at least a pair of members extending outwardly from a peripheral edge of said child safety device and operatively engaging a respective receptacle.

15. The child safety system, according to claim 14, wherein said child safety device includes a peripheral frame and a mesh disposed within a periphery of said frame.

16. The child safety system, according to claim 14, wherein at least a portion of said child safety device is formed from an elastic material.

17. The child safety system, according to claim 14, wherein said each of said at least pair of receptacles has one end thereof secured to a portion of the peripheral surface of the door aperture, an opposed end thereof extending into the door aperture and a mounting aperture formed through said opposed end of said each said at least pair of receptacles, wherein axis of said mounting aperture is disposed generally parallel with axis of the door aperture.

18. The child safety system, according to claim 17, wherein each of said at least pair of members is a generally L-shaped member that includes each of a first leg secured to and extending outwardly from said peripheral edge of said child safety device in a direction which is coplanar with a plane of said child safety device, a second leg disposed generally perpendicular to said first leg and a spherical portion secured to said second leg and passing through said mounting aperture formed in said respective receptacle, said spherical portion positioned behind said aperture when said child safety device is installed for covering the door aperture, wherein said mounting aperture and said spherical portion are sized to prevent a child from exerting a sufficient force to remove said spherical portion through said mounting aperture.

19. A child safety device for preventing a child to pass through a door aperture formed in one wall of an appliance and into a cavity of the appliance, the door aperture being defined by a peripheral surface disposed within the one wall of the appliance, the appliance further having a door movable between an open position for uncovering the door aperture and a closed position for covering the door aperture, the door is disposed generally planar with the one wall of the appliance in the closed position, said child safety device comprising a peripheral frame positioned within the peripheral surface of the door aperture, a mesh and members disposed on and secured to a pair of opposed edges of said frame for releaseably securing said device within the peripheral surface of the door aperture and in a position to cover at least a portion of the door aperture which is sufficient to prevent passage of the child therethrough when the door of the appliance is disposed in the open position.

20. The child safety system, according to claim 18, wherein the size of said mounting aperture is less than a size of said spherical portion.

* * * * *